(12) United States Patent
Liu et al.

(10) Patent No.: US 9,509,545 B2
(45) Date of Patent: Nov. 29, 2016

(54) SPACE AND LATENCY-EFFICIENT HSDPA RECEIVER USING A SYMBOL DE-INTERLEAVER

(71) Applicant: BlackBerry Limited, Waterloo (CA)

(72) Inventors: Xiang Liu, Siegburg (DE); Damian Kelly Harris-Dowsett, Coventry (GB); Stephen Carsello, Plantation, FL (US); Thomas Keller, Cambridge (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/946,520

(22) Filed: Jul. 19, 2013

(65) Prior Publication Data
US 2015/0023401 A1   Jan. 22, 2015

(51) Int. Cl.
*H04L 27/34* (2006.01)
*H04W 28/06* (2009.01)
*H04W 52/02* (2009.01)
*H04L 27/38* (2006.01)
*H04L 1/00* (2006.01)

(52) U.S. Cl.
CPC ......... *H04L 27/3405* (2013.01); *H04L 1/0052* (2013.01); *H04L 1/0071* (2013.01); *H04L 27/38* (2013.01); *H04W 28/06* (2013.01); *H04W 52/0209* (2013.01)

(58) Field of Classification Search
USPC ......................................... 375/261, 324, 329
See application file for complete search history.

(56) References Cited

U.S. PATENT DOCUMENTS

| | | | | | |
|---|---|---|---|---|---|
| 6,158,041 | A | * | 12/2000 | Raleigh et al. | 714/792 |
| 6,233,712 | B1 | * | 5/2001 | Rhee et al. | 714/789 |
| 7,187,708 | B1 | * | 3/2007 | Shiu | H04B 1/707 341/81 |
| 2009/0245431 | A1 | * | 10/2009 | Challa et al. | 375/340 |

FOREIGN PATENT DOCUMENTS

| | | |
|---|---|---|
| EP | 1134945 A1 | 9/2001 |
| EP | 2134052 A1 | 12/2009 |
| WO | 2011/093834 A1 | 8/2011 |

OTHER PUBLICATIONS

Extended European Search Report from related European Patent Application No. 14177689.8 dated Nov. 18, 2014; 7 pages.

* cited by examiner

*Primary Examiner* — Kabir A Timory
(74) *Attorney, Agent, or Firm* — Jeffrey N. Giunta; Fleit Gibbons Gutman Bongini & Bianco P.L.

(57) ABSTRACT

A method at a mobile device, the method comprising: receiving one or more data symbols; determining reduced symbols for each of the data symbols, the reduced symbols corresponding to each of at least two orthogonal components of the data symbols; and, storing the reduced symbols in a symbol buffer.

14 Claims, 8 Drawing Sheets

SPACE AND LATENCY-EFFICIENT HSDPA RECEIVER USING A SYMBOL DE-INTERLEAVER

FIELD OF THE TECHNOLOGY

The present disclosure relates to electronic devices, wireless communication systems, and methods of operation therefore, for facilitating the decoding of received signals.

BACKGROUND

In modern wireless telecommunication systems, digital modulation can be used to transfer digital data over physical channels. By mapping data to predefined symbols, where each symbol sets the characteristics of an analog carrier signal, digital data can be transferred long distances. A mobile device, also referred to as user equipment 'UE', on receiving the modulated data, which may have also been interleaved, encoded, spread and scrambled, would attempt to extract the data out of the received signal.

As mobile devices are typically limited in storage, processing and battery capacity. Therefore, while there is a need to accurately determine the transmitted data, it is desirable for these portable devices to achieve this accuracy while maintaining strict computational restrictions to reduce battery usage, ensure low latencies, and minimise storage space usage.

BRIEF DESCRIPTION OF DRAWINGS

Examples of the present proposed approach will now be described in detail with reference to the accompanying drawings, in which.

DETAILED DESCRIPTION

Figure 1:
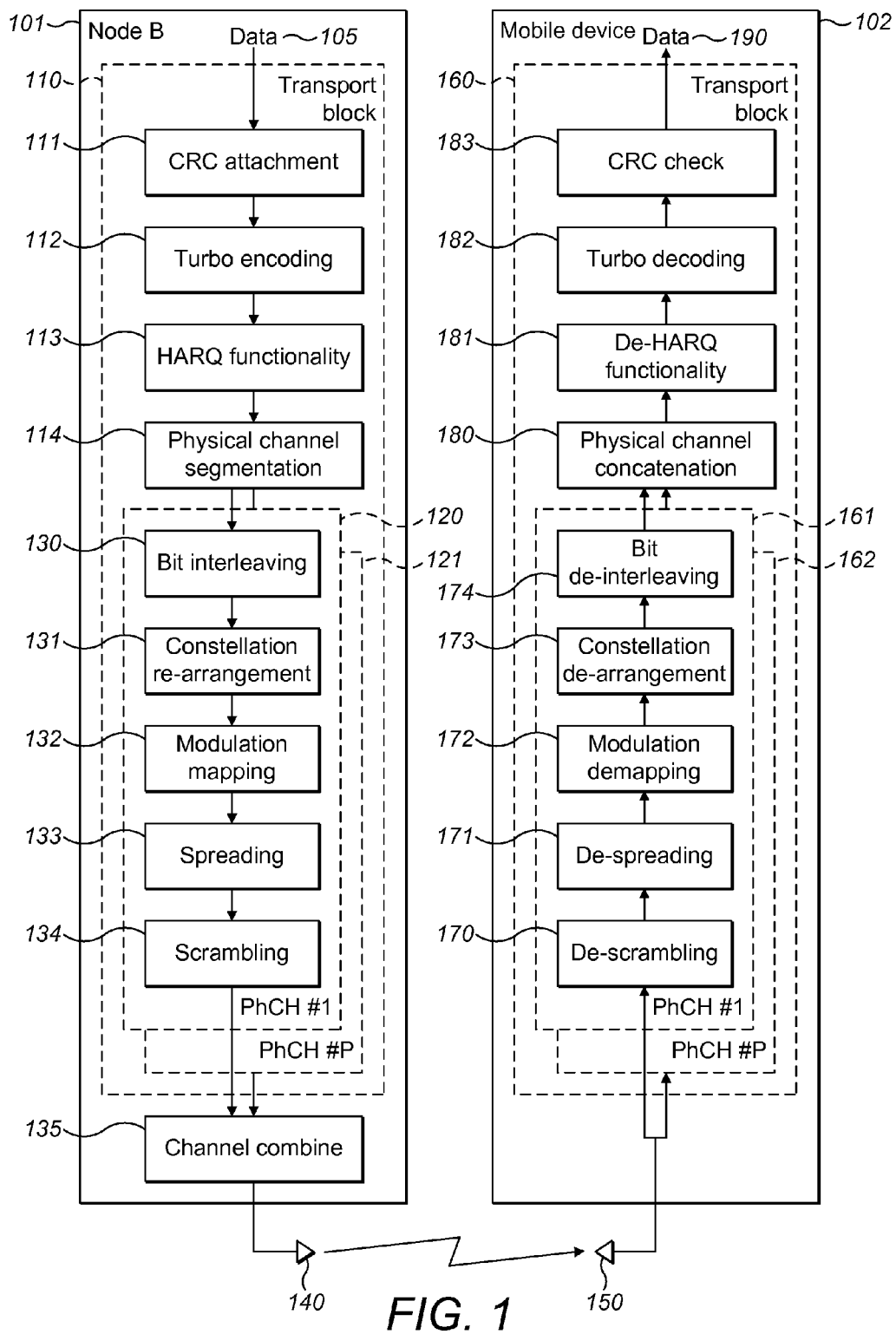
FIG. 1 is a simplified block diagram of a Node B and a mobile device representing the processing that data may undergo in the transmission and reception using High Speed Downlink Packet Access (HSDPA) technology.

In one embodiment, the present disclosure provides a method at a mobile device, the method comprising: receiving one or more data symbols; determining reduced symbols for each of the data symbols, the reduced symbols corresponding to each of at least two orthogonal components of the data symbols; and, storing the reduced symbols in a symbol buffer.

Using a symbol buffer that stores reduced symbols instead of a soft bit buffer for storing soft bit decisions associated with symbols may reduce the memory requirements of the buffer. Soft bit decisions typically use a disproportionate amount of memory compared to the data they represent. For example a single bit represented by a soft decision may require 6 bits of storage space. A symbol representing 3 bits of information, on the other hand, may only require 10 bits of space to store, compared to the 18 bits (3×6) required to store three soft bit decisions. Different soft decision schemes require different amounts of storage (for example, greater or less than 6 bits) to store a soft decision, but the amount of space required to store multiple soft decisions will generally require more storage space than the space required to store a symbol. The storage required for storing a symbol may also vary depending on the storage scheme used (for example, greater or less than 10 bits to store a symbol representing 3 bits).

It may be possible to use symbol buffers instead of soft bit buffers by finding a reduced set of symbols to store instead of the received data symbols received. Large data symbols may comprise multiple orthogonal components, so reduced symbols may be used to represent these orthogonal components instead of the data symbol as a whole.

In some example embodiments the data symbols are quadrature amplitude modulated 'QAM' symbols, and the reduced symbols are pulse amplitude modulated 'PAM' symbols. Although QAM symbols may be received at the mobile device, a QAM symbol can be represented by two PAM symbols, which when operated on instead of QAM symbols may result in lower system requirements.

In some example embodiments the at least two orthogonal components of the data symbols are in-phase and quadra-phase components of QAM symbols. A QAM symbol can be easily converted to two PAM symbols by determining the in-phase and quadrature components of the QAM symbol.

In some example embodiments the data symbols are N-QAM symbols, and the reduced symbols are two $\sqrt{N}$-PAM symbols for each received N-QAM symbol. For example, where N=64, the reduced symbols are two 8-PAM symbols for each received 64-QAM symbol.

In some example embodiments the one or more data symbols are received from one or more physical channels.

In some example embodiments the method further comprising estimating amplitudes of the received data symbols.

In some example embodiments the method further comprising de-interleaving the reduced symbols. When symbols are stored as reduced symbols, de-interleaving may be performed before modulation demapping, thus reducing the latency in waiting for modulation demapping to complete which itself is generally delayed from awaiting amplitude estimation.

In some example embodiments de-interleaving the reduced symbols is performed by a symbol de-interleaver at the mobile device. Performing de-interleaving on reduced symbols rather than soft decisions allows the de-interleaving to be performed before modulation demapping, thereby reducing the latency of the system.

In some example embodiments the symbol buffer is a physical channel 'PhCH' buffer at the mobile device.

In some example embodiments the symbol de-interleaver demaps the reduced symbols.

In some example embodiments the method further comprising de-interleaving soft bits which are demapped from reduced symbols.

In some example embodiments prior to de-interleaving soft bits which are demapped from reduced symbols, the soft bits are constellation de-arranged.

In some example embodiments after symbol de-interleaving, the de-interleaved symbols are modulation demapped. Performing de-interleaving before modulation demapping may reduce the latency of de-interleaving as the modulation demapping step is typically reliant on the generally high latency step of QAM amplitude estimation.

In some example embodiments the method further comprising constellation de-arranging the modulation demapped symbols. Constellation de-arranging may be performed before or after modulation demapping.

In some example embodiments the symbol buffer is a subframe symbol buffer stored in local memory of the mobile device. Storing the subframe symbol buffer in local memory reduces the power consumption required by the mobile device to access the subframe symbol buffer and reduces the latency in processing stored data. Furthermore, storing the subframe symbol buffer in local memory allows the role of the PhCH buffer to be incorporated with the subframe symbol buffer, thus reducing the number of buffers required on the mobile device.

In some example embodiments the subframe symbol buffer stores de-interleaved reduced symbols from the de-interleaver. As de-interleaving can be performed before the modulation demapping, and therefore before the subframe symbol buffer, the number of buffers required may be less as a separate buffer for individual PhCHs may not be required.

In another embodiment, the present disclosure provides a mobile device configured to perform any of methods disclosed above. The mobile device may comprise computer readable executable instructions for performing any of the methods disclosed above. The mobile device may comprise digital signal processor (DSP) instructions for performing any of the methods disclosed above. The mobile device may comprise one or more application-specific integrated circuits (ASIC) or one or more field-programmable gate array (FPGA) circuits, for example, for performing any of the methods disclosed above.

Reference will now be made to FIG. 1 which shows an Node B 101 in wireless communication with a mobile device 102. FIG. 1 illustrates various steps that may be performed at the Node B 101 on data 105 to prepare it for transmission and example steps that may be performed at the mobile device 102 to extract data 190.

The steps illustrated in FIG. 1 are typically used in High Speed Downlink Packet Access (HSDPA) wireless protocol in Wideband Code Division Multiple Access (WCDMA) systems. However, the systems disclosed are provided by way of example only, as the proposed solution may be used in a wide range of protocol and standards.

The data 105 for a given transport block (TB) 110 may undergo Cyclic Redundancy Check (CRC) attachment 111, used for error detection, where CRC parity bits are calculated for the entire transport block 110 and attached or appended to the end of the transport block 110. The data may then undergo turbo encoding 112, a forward-error-correction scheme for improving the channel capacity by adding redundant information. Hybrid Automatic Repeat Request (HARQ) functionality 113 may be used to provide a retransmission scheme for when a receiving mobile device 102 fails to receive the correct data. At this point a physical channel segmentator 114 may be implemented where more than one physical channel (PhCH) is used in order to divide the bits among the different PhCHs (120 and 121).

For each PhCH, further data processing steps may be performed. For example bit interleaving 130 may be used to spread the information bits through time such that if a burst error occurs, the error would also be spread out between the pre-interleaved code streams, improving the chances of recovering the data.

If a string of data is sent as a constellation that is particularly susceptible to errors, resubmitting the data as the same constellation may result in a repeated error. Therefore, performing constellation re-arrangement 131 may reduce the performance degradation caused by same-constellation mapping in re-transmission.

The modulation mapping 132 step maps a string of data to a symbol defining the characteristics of a transmission signal. These symbols are then spread 133 and scrambled 134, and the data from the different physical channels (120 and 121) are combined 135 and transmitted as a transport block from the one or more antennas 140 of the Node B.

The transmitted transport block is received at one or more antennas 150 at the mobile device 102 which attempts to invert the various encoding steps performed at the Node B to arrive at the original data 105. For each of the physical channels (161 and 162) the data is descrambled 170, de-spread 171 and modulation demapped 172 to extract the bits or soft decisions from received symbols. Constellation de-arrangement 173 takes place and the bits are de-interleaved 174. The de-interleaved bits from each of the physical channels (161 and 162) are combined together at the physical channel concatenation 180 step. De-HARQ functionality 181 is provided to perform rate de-matching and HARQ combining, while final error corrections take place at the turbo decoder 182 and CRC check 183.

The modulation mapping 132 and corresponding modulation demapping 172 steps in FIG. 1 maps data to symbols (and symbols to data) depending on the modulation scheme being used. Examples of modulation schemes include BPSK (binary phase-shift keying), PAM (pulse-amplitude modulation), QPSK (quadrature phase-shift keying) and QAM (quadrature amplitude modulation). By modifying the phase, amplitude or any other characteristic of a carrier wave, a receiving mobile device 102 can detect these characteristics and determine what symbol matches closest to the characteristics.

The exact steps and the ordering of steps shown in FIG. 1 and all the examples disclosed are provided as examples only. In other communication protocols and specific implementations of protocols, the exact steps and ordering may vary greatly. However, it would be clear to the skilled person how to adapt the proposed solution provided herein to similar communication systems to achieve similar benefits of the proposed solution.

Figure 2:
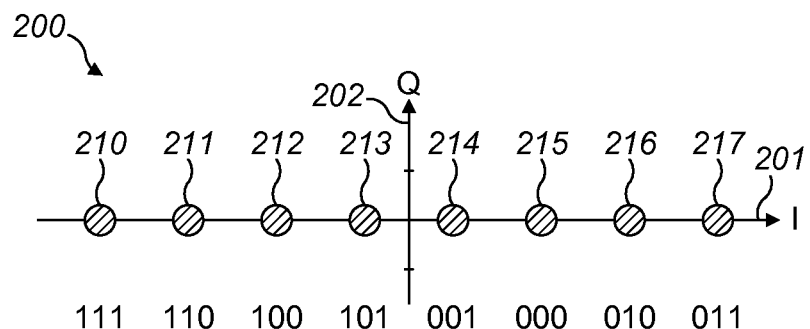
FIG. 2 is a constellation diagram illustrating the possible symbols for an 8-Pulse Amplitude Modulation (PAM) scheme.

FIG. 2 illustrates an example of a specific modulation scheme, 8-PAM (pulse-amplitude modulation). With the 8-PAM modulation scheme, a carrier wave's amplitude can be varied in eight discrete levels to indicate eight different symbols. The constellation diagram 200 represents the real and imaginary components of a carrier, also referred to as the in-phase component 201 (I) and the quadraphase component 202 (Q). In the example of 8-PAM, the phase is kept fixed while the amplitude is varied, so the possible symbols 210 to 217 are distributed in only one dimension along the in-phase axis 201. As there are eight possible amplitudes, and therefore eight possible symbols in 8-PAM, each of these symbols can represent 3-bits of data. For example symbol 210 may indicate bits '111', while symbol 214 may indicate bits '001'.

Figure 3:
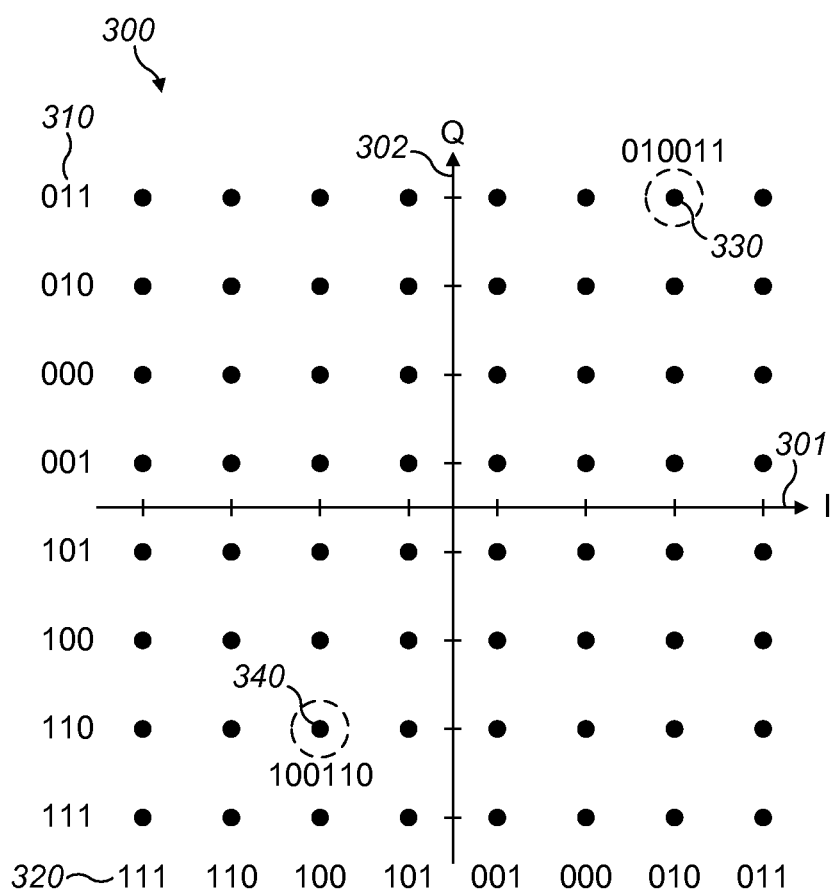
FIG. 3 is a constellation diagram illustrating the possible symbols for a 64-Quadrature Amplitude Modulation (QAM) scheme.

The amount of data that can be represented by a single symbol in a modulation scheme can be increased by varying phase as well as amplitude. FIG. 3 illustrates such a modulation scheme, 64-QAM (quadrature amplitude modulation), where both amplitude and phase can be varied, allowing for 64 available symbols corresponding to 6-bits of data each. The constellation diagram 300, represents all the available symbols for 64-QAM. In this example, there are eight discrete positions available along the in-phase axis 301 and eight discrete positions available along the quadraphase axis 302, where the symbol's position along the I axis 301 determines the three most significant bits (as indicated by mapping 320) and the symbol's position along the Q axis 302 determines the three least significant bits (as indicated by mapping 310). For example, the symbol 330 is at the position on the I axis 301 corresponding to bits '010' and at the position of the Q axis 302 corresponding to bits '011', this the symbol 330 as a whole represents bits '010011'. Similarly, the location of symbol 340 results in a bit mapping of '100110'.

The mappings indicated in FIG. 3 are only examples of mappings in a 64-QAM system, and several different mapping and types of mappings may be used. A symbol's position on the I axis 301 may determine the three least significant bits of the symbol, instead of the most significant bits, or individual bits such as the $1^{st}$, $3^{rd}$ and $5^{th}$ bits. The different quadrants of the constellation diagram 300 may have different mapping rules, for example the bits associated with the in-phase position might be different in one quadrant compared to another quadrant. Each of the 64 symbols may have a bit value assigned to it in accordance with mappings other than those based on the symbols positions along axes, and may increment in a circular pattern around the constellation diagram 300, for example, or any other layout.

Figure 4:
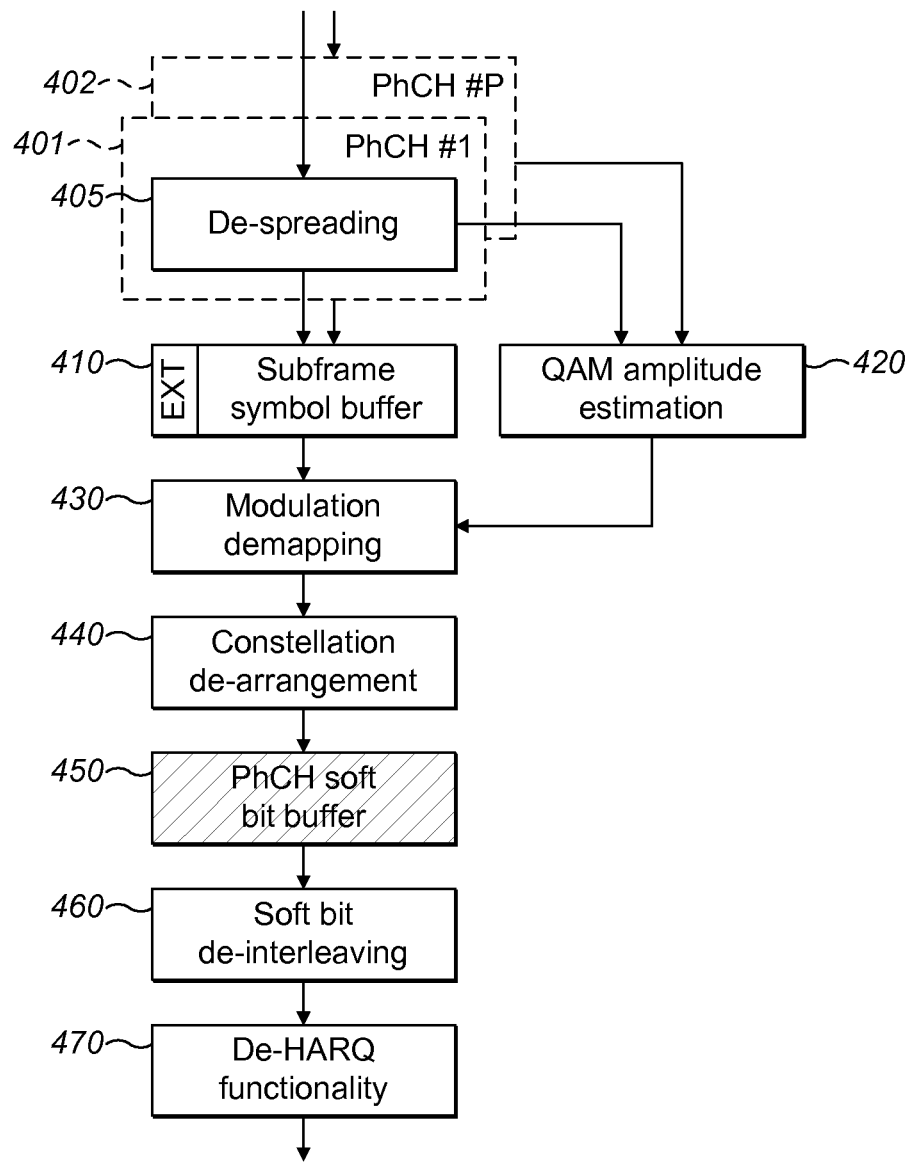
FIG. 4 is a block diagram illustrating steps taken in a typical receiver device.

FIG. 4 illustrates a typical implementation in an HSDPA receiver from the de-spreading stage to de-HARQ functionality. The mobile device 102 receives symbols from all cells, all transport blocks (in this example, two transport blocks) and all PhCHs (channels 1 401 to P 402) arriving in parallel. Within each PhCH, de-spreading 405 and de-scrambling may be performed. Since a PhCH spans over a whole subframe while the symbols arrive simultaneously, a symbol buffer 410 is required between de-spreading 405 and de-interleaving 460 for storing the symbol of the subframe (often double buffered). As this symbol buffer 410 is storing symbols from the whole subframe, including multiple PhCHs, the memory size can be very large. For example, assuming 8 cells, 2 TBs and 15 PhCHs (like in a mobile device with HSDPA Category 36), the subframe symbol buffer 410 would need to be large enough to store 115,200 QAM symbols (8×2×[15×480]). Such a large subframe symbol buffer may be too large to store on local memory, so would be placed in external memory. Potential disadvantages with externally stored subframe symbol buffers are that they may consume more power than local storage and may be slower at accessing data, increasing latency.

To demap HSDPA QAM symbols at the modulation demapping stage 430, the mobile device may require amplitude information. This amplitude information, however, is not explicitly signalled in WCDMA/HSDPA, so it has to be estimated 420 before the first QAM symbol in a subframe can be demapped. Due to the adaptive modulation and coding with HSDPA, the QAM amplitude has to be estimated at least every subframe (where 1 subframe=1 HSDPA TTI=2 ms). Due to the dynamic power usage with HSDPA, the ratio between the HSDPA power and the common channel power may vary every subframe, so the QAM amplitude cannot be estimated using the common channel, e.g. the common pilot channel. Since there is no dedicated pilot transmitted along with HSDPA, the QAM amplitude has to be estimated from the de-spread HSDPA data symbols. As the modulation demapper 430 has to wait for the associated amplitude estimation 420 before demapping a symbol, it may take advantage of the subframe symbol buffer 410 to store the symbols while the amplitude is estimated.

While QAM amplitude estimation 420 and subframe symbol buffer may take the symbols in a subframe over all PhCHs as input, the subsequent steps such as modulation demapping 430 may be performed on the symbols of each PhCH separately. The demapped symbols from the modulation demapper 430 may be processed at the constellation de-arrangement step 440. At this point, the data extracted from the received symbols may be in the form of soft bit decisions.

Although a 64-QAM symbol, for example, may correspond to 6 bits of data, the soft decision of each of these bits may be represented by 6 bits in order to indicate the reliability of each of the estimations for the soft decision. As a result, a 64-QAM symbol, after modulation demapping 430 and constellation de-arrangement 440 may require 36 bits to store (6 soft decisions×6 bits per soft decision), and these soft bits decisions may be stored at a local PhCH soft bit buffer 450. Assuming a 64-QAM modulation scheme, where 480 QAM symbols are received in each PhCH within a subframe, the PhCH soft bit buffer 450 would need to be able to store 2,880 soft decisions (480×6), which may require 17,280 bits of space (2880×6), or 34,560 bits if double buffered.

The soft bit decisions stored at the PhCH soft bit buffer 450 may be de-interleaved at a soft bit de-interleaver 460, before passing on the de-interleaved bits to the de-HARQ functionality 470 and further processing of the data. Alternatively, the soft bit decisions from the constellation de-arrangement 440 may be sent directly to a soft bit de-interleaver, and the de-interleaved soft bits are then stored at a PhCH soft bit buffer.

The storage requirement of the externally stored subframe symbol buffer 410 and local PhCH soft bit buffers can be high, particularly when large QAM symbols are received. It would be desirable to reduce the size of these buffers, particularly in portable mobile devices where storage space is limited.

One of the reasons why local PhCH buffers need to be large when storing data for QAM symbols is that soft bit decisions for QAM symbols tend to require more space than the data associated with the symbols themselves. For example, a 64-QAM symbol represents 6 bits of data, but at the mobile device a single 64-QAM symbol after modulation demapping may require 36 bits of data to store the soft bit decisions.

In the proposed solution, each QAM symbol is treated as two PAM symbols, and these symbols are de-interleaved, rather than the soft bits.

A QAM symbol defines a specific amplitude and phase of a carrier wave and maps a data value to these characteristics of the wave. As shown in FIG. 3, the constellation diagram 300 indicates that symbols further from the centre represent higher amplitudes, and symbols with larger polar coordinates represent larger phases. However, rather than interpreting the constellation diagram 300 in polar coordinates, it could be interpreted as rectangular or Cartesian coordinates, with the in-phase axis 301 and quadraphase axis 302 shown. In this way, a single QAM symbol may be represented as two PAM symbols, defining the symbol position along the in-phase axis 301, the other defining the symbol position along the quadraphase axis 302.

For example, the 64-QAM symbol 330 may have its in-phase position defined by an 8-PAM symbol 216 (associated with bits '010') in FIG. 2, and its quadraphase position define by an 8-PAM symbol 217 (associated with bits '011'), which together define a QAM symbol associated with bits '010011'. Similarly, a 16-QAM symbol can be represented by two 4-PAM symbols, and a 256-QAM symbol can be represented by two 16-PAM symbols. Each PAM symbol may represent m/2 bits (where m=2 for QPSK, m=4 for 16-QAM, m=6 for 64-QAM, and m=8 for 256-QAM). The proposed solution need not be limited to reducing a QAM symbol to two PAM symbols, as it could apply to any reduction of a large symbol into multiple smaller symbols representing different components of the large symbol.

There are several ways of determining the two PAM symbols that correspond to a single QAM symbol. For example, the determining could be performed mathematically, by taking the properties of the complex number associated with the QAM symbol and calculating the real and imaginary parts. The signal associated with the QAM symbol may be split into two identical signals, and the first signal is multiplied by a local oscillator phase locked to the carrier frequency (resulting in signal corresponding to the in-phase component), while the second signal may be multiplied by the same local oscillator that has been phase shifted by 90° (resulting in a signal corresponding to the quadraphase component). Another possible method of determining the PAM symbols corresponding to a received QAM symbol is to refer to a lookup table within the device.

While a received QAM symbol may considered to be the original or full data symbol, the symbols it can be reduced to, such as two PAM symbols, may be considered as being 'reduced symbols'. However, a reduced symbol may be any group of symbols that, together, can represent a received data symbol where the individual reduced symbols require a smaller amount of data to store than the received data symbol. In the examples provided, reduced symbols are two PAM symbols corresponding to each QAM symbol, however, it should be clear to the skilled person that a reduced symbol can be any symbol that can represent a larger received data symbol.

Rather than use a soft bit de-interleaver to de-interleave the soft bits extracted from a QAM symbol, a symbol de-interleaver may be used instead, performing de-interleaving on the two PAM symbols associated with the QAM symbol.

A symbol de-interleaver may not necessarily need to know the modulation scheme to perform de-interleaving on the PAM symbols, making it possible to position it before a modulation demapping step. This result is possible from the fact that an HSDPA bit interleaver groups every m consecutive bits into m/2 pairs, and each pair goes to an identical bit sub-interleaver. Similarly every m consecutive interleaved bits can also be grouped into m/2 pairs. The first bits in all interleaved pairs may be in-phase bits while the second bits in all interleaved pairs may be quadraphase bits. This property may remain even after constellation re-arrangement. However, the bit pairs before interleaving may not correspond to in-phase/quadraphase pairs due to interleaving.

Figure 5:
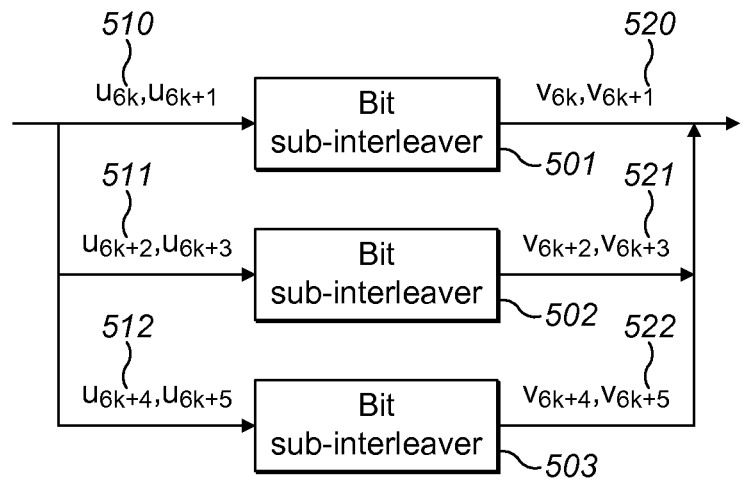
FIG. 5 is a block diagram illustrating an example 64-QAM bit interleaver.

FIG. 5 shows an example of a 64-QAM bit interleaver, like one used in at an Node B 101 at the bit interleaving 130 step. For 64-QAM schemes, data bits may be grouped together into groups of six, so that they can be eventually mapped onto a 64-QAM symbol. In a 64-QAM bit interleaver, there may be three bit sub-interleavers (501, 502 and 503), each one assigned to two of the six bits grouped together for symbol mapping. For example, the first bit sub-interleaver 501 may take the first and second bits 510 of the 6-bit group, represented as $u_{6k}$ and $u_{6k+1}$, where $u_{6k}$ is the first bit of the $k^{th}$ symbol and $u_{6k+1}$ is the second bit of the $k^{th}$ symbol before interleaving. Similarly, the second bit sub-interleaver 502 takes the third and fourth bits 511 of the $k^{th}$ symbol before de-interleaving as input, and the third bit sub-interleaver 503 takes the fifth and sixth bits 512 of the $k^{th}$ symbol before de-interleaving as input. The outputs of these bit sub-interleavers are of the form $v_{6k+i}$, representing the $i^{th}$ bit of the $k^{th}$ symbol after interleaving (mod k). In other words, the first bit sub-interleaver 501 may output the first pair of bits 520 for the $k^{th}$ symbol, the second sub-interleaver 502 may output the second pair of bits 521 for the $k^{th}$ symbol, and the third sub-interleaver 503 may output the first pair of bits 522 for the $k^{th}$ symbol.

Furthermore, the $v_{6k}$, $V_{6k+2}$, and $V_{6k+4}$ bits at the outputs of the three bit sub-interleavers may be in-phase bits that are mapped to an in-phase PAM symbol, while the $V_{6k+1}$, $V_{6k+3}$, and $V_{6k+5}$ bits may be the quadraphase bits mapped to a quadraphase PAM symbol.

Figure 6:
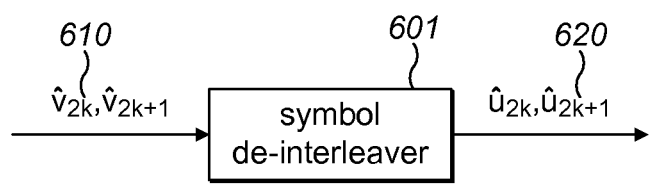
FIG. 6 is a block diagram illustrating an example 64-QAM symbol de-interleaver.

A symbol de-interleaver 601, in accordance with the proposed solution, is shown in FIG. 6. This symbol de-interleaver 601 may take as input $\hat{v}_{2k}$ and $\hat{v}_{2k+1}$ 610 as the in-phase and quadraphase of the $k^{th}$ QAM symbol before de-interleaving respectively. In other words, $\hat{v}_{2k}$ and $\hat{v}_{2k+1}$ 610 are PAM symbols. $\hat{u}_{2k}$ and $\hat{u}_{2k+1}$ 620 are output as a pair of consecutive PAM symbols after de-interleaving, but or not necessarily an in-phase/quadraphase pair due to the interleaving. The symbol de-interleaver 601 may apply the same rules as the bit sub-interleavers of FIG. 5, but using PAM symbols instead of bits. The symbol de-interleaver 601 may also incorporate modulation demapping within it as well as constellation re-arrangement.

Figure 7:
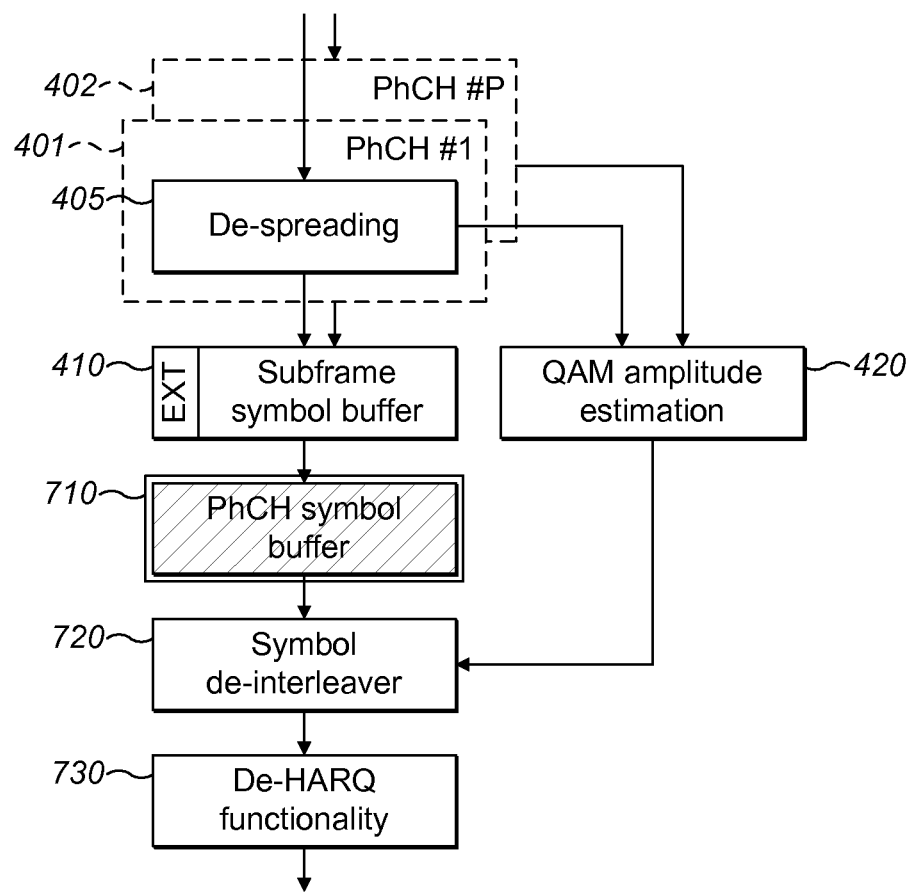
FIG. 7 is a simplified block diagram illustrating the steps taken in a mobile device in accordance with an embodiment of the proposed solution utilising a physical channel (PhCH) symbol buffer and symbol de-interleaver.

FIG. 7 is a simplified block diagram illustrating the steps taken in a mobile device in accordance with an embodiment of the proposed solution utilising a physical channel (PhCH) symbol buffer and symbol de-interleaver. Similar to the example mobile device 102 illustrated in FIG. 4, the mobile device 102 receives symbols in each of the P number of PhCHs (401 and 402) and are de-spread within the PhCHs, before being stored in the subframe symbol buffer 410 and have the QAM amplitude estimated 420 in parallel. Different from typical solutions, the symbols may be stored in a local PhCH symbol buffer 710 as reduced symbols rather than stored in a local PhCH soft bit buffer as soft decisions or bit data. The reduced symbols may comprise PAM symbols corresponding to the in-phase and quadraphase components of a received QAM symbol.

The PAM symbols stored in the PhCH symbol buffer 710 may then be de-interleaved at a symbol de-interleaver 720, which takes interleaved symbols as an input and outputs either de-interleaved symbols or de-interleaved bits associated with the input symbols. The output of the symbol de-interleaver 720 may then continue to have De-HARQ functionality performed 730 or other data processing steps at the mobile device.

Storing data locally as reduced symbols rather than soft decisions may reduce the amount of local storage space required for PhCH buffers. As previously mentioned, a PhCH may contain 480 64-QAM symbols within a single subframe, and storing the soft decision associated with these 64-QAM symbols in a soft bit buffer may require 17,280 bits of space. In the proposed PhCH symbol buffer, it would store 960 8-PAM symbols (two 8-PAM symbols for each of the 480 64-QAM symbols), and because each 8-PAM symbol could be stored as 10 bits, this would lead to a PhCH symbol buffer size requirement of only 9,600 bits (960×10), compared to 17,280 bits for a PhCH soft bit buffer. Therefore, storing 8-PAM symbols instead of soft bit decisions may result in a 44.4% saving in local memory storage space in this example for 64-QAM symbols.

The QAM amplitude may be estimated more than once per subframe and a number of estimations may be buffered. However, modulation demapping requires knowledge of an interleaved position of a symbol in order to get its associated QAM amplitude. Therefore, the modulation demapping may be implemented together with de-interleaving in the symbol de-interleaver 720 in order to avoid extra de-interleaving logic for the modulation demapping step.

Figure 8:
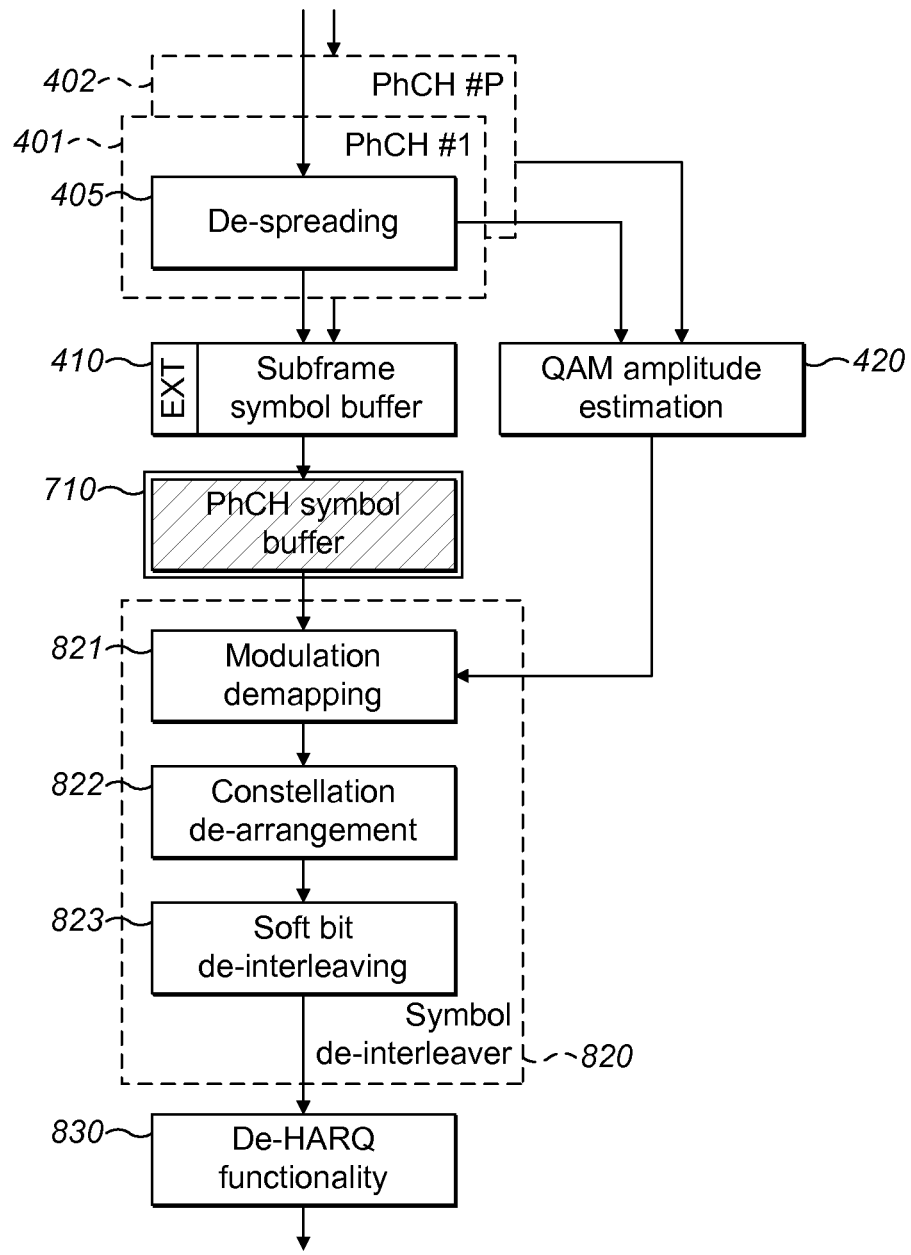
FIG. 8 is a block diagram illustrating the steps taken in a mobile device in accordance with an embodiment of the proposed solution, where a symbol de-interleaver comprises a modulation demapper and a soft-bit de-interleaver.

FIG. 8 shows an example implementation of the proposed solution shown in FIG. 7, but showing an example internal configuration of the symbol de-interleaver 820. In this implementation the modulation demapping step 821 is performed before de-interleaving 823 in the symbol de-interleaver system 820. Therefore, the symbols stored in the PhCH symbol buffer 710 are first modulation demapped 821, constellation de-arranged 822 and then the soft bit decision output is soft bit de-interleaved 823. Although soft-bit de-interleaving is being utilised in this implementation, the symbol de-interleaver system 820 as a whole takes symbols as input from the PhCH symbol buffer and outputs de-interleaved data.

Figure 9:
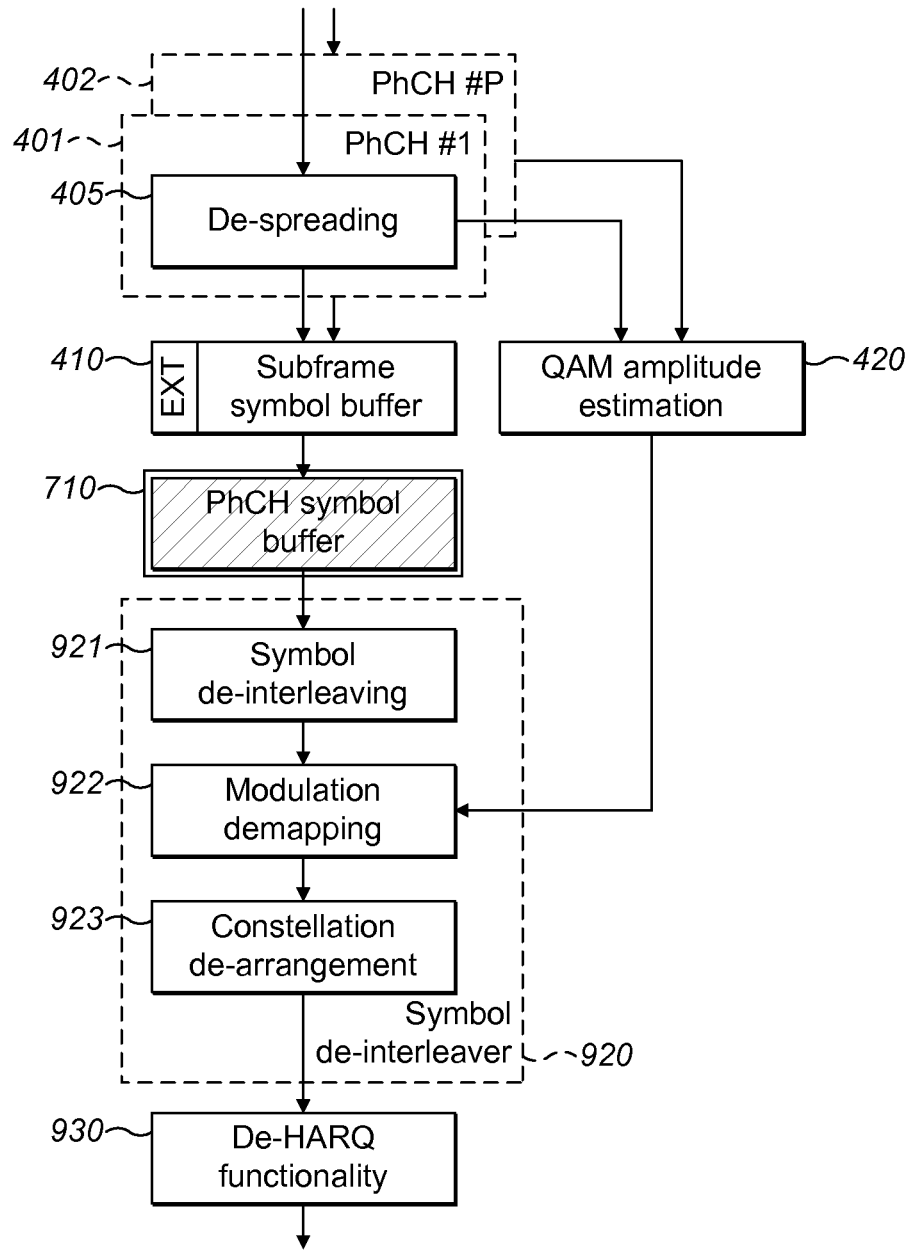
FIG. 9 is a block diagram illustrating the steps taken in a mobile device in accordance with an embodiment of the proposed solution, where a symbol de-interleaver comprises a symbol de-interleaving step followed by a modulation demapper step.

FIG. 9 shows another example implementation of the proposed solution shown in FIG. 7, with an example internal configuration of the symbol de-interleaver 920. In this implementation the modulation demapping step 922 is performed after de-interleaving 921 in the symbol de-interleaver system 920. Therefore, the symbols stored in the PhCH symbol buffer 710 are first de-interleaved at the symbol de-interleaving step 921 and these de-interleaved symbols are processed at the modulation demapping 922 and constellation de-arrangement 923 steps, outputting soft bit decisions. The output of the de-interleaving step 921 may be de-interleaved PAM symbols, or the PAM symbols may have been recombined to form the corresponding QAM symbol for input into the modulation demapping step 922. The demapped bits in the symbol de-interleaver system 920 may need to be inserted alternatively, either after modulation demapping 922 or constellation de-arrangement 923, so that the input bits to the de-HARQ functionality 930 are in the correct order.

In the example embodiments shown in FIGS. 7 to 9, the subframe symbol buffer 410 is located in external memory, as the amount of storage space required to store all the symbols in the subframe from all the PhCHs may be too large to be stored in local memory. However, for smaller subframe, for example mobile devices with HSDPA Category 1-6, where there is only 1 cell, 1 TB and 5 PhCHs for each subframe, the subframe buffer would only need to store 2400 QAM symbols, resulting in a subframe buffer small enough to keep in local memory.

Figure 10:
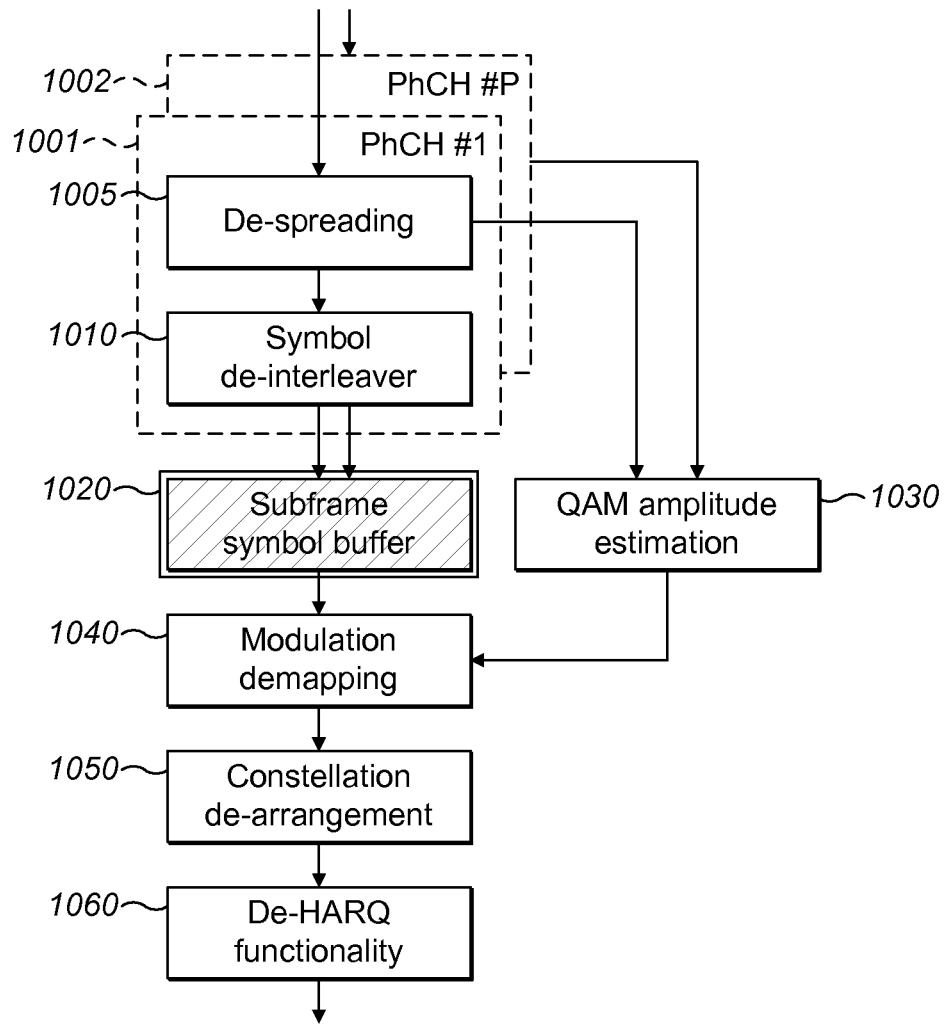
FIG. 10 is a block diagram illustrating the steps taken in a mobile device in accordance with an embodiment of the proposed solution, where a subframe symbol buffer is stored locally at the mobile device.

FIG. 10 illustrates an embodiment where the subframe symbol buffer 1020 is stored in local memory at the mobile device 102. By storing the subframe symbol buffer 1020 locally, it avoids accessing external memory which may consume more power and read data slower.

Symbols are received in the different PhCHs (1001 and 1002), and de-spread 1005 within the PhCHs. For each PhCH, the symbol de-interleaver 1010 of the proposed solution may de-interleave the symbols and output the de-interleaved symbols to the local subframe symbol buffer 1020. The symbol de-interleaver 1010 may de-interleave the received symbols as reduced symbols and output those reduced symbols to the subframe symbol buffer 1020.

The subframe symbol buffer 1020 may store the symbols while QAM amplitude estimation 1030 is performed on the subframe before sending the de-interleaved symbols to the modulation demapping step 1040. From here the data may be constellation de-arranged 1050 and de-HARQ functionality 1060 may be applied. By arranging the mobile device in this way, less memory space is required overall, as a separate PhCH buffer is no longer required. Furthermore, power consumption and processing delay is reduced.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A method at a mobile device, the method comprising:
de-spreading one or more data symbols to produce de-spread data symbols, each data symbol representing respective data encoded as a respective quadrature amplitude modulated 'QAM' symbol;
determining reduced symbols based on the de-spread data symbols, each reduced symbol comprising:
a respective first pulse amplitude modulated 'PAM' symbol representing a respective PAM data symbol for an in-phase component of a respective data symbol, and
a respective second pulse amplitude modulated 'PAM' symbol representing a respective PAM data symbol for a quadrature component of the respective data symbol,
wherein the in-phase component of the respective data symbol and the quadrature component of the respective data symbol indicate independent data;
storing, prior to modulation demapping to determine soft decisions from the reduced symbols, the reduced symbols in a symbol buffer;
while storing the reduced symbols in the symbol buffer and prior to performing the modulation demapping, estimating QAM amplitudes of the de-spread data symbols;
after the storing, de-interleaving the reduced symbols to produce de-interleaved reduced symbols;
performing, based on the estimating QAM amplitudes, the modulation demapping on the de-interleaved reduced symbols to produce soft decisions;
performing constellation de-arrangement of the soft decisions; and
based on performing the constellation de-arrangement, performing rate de-matching and HARQ combining of the soft decisions.

2. The method of claim 1, wherein the data symbols are N-QAM symbols, and the reduced symbols are two $\sqrt{N}$-PAM symbols for each received N-QAM symbol, wherein N is a number of different QAM symbols available.

3. The method of claim 1, wherein the one or more data symbols are received from one or more physical channels.

4. The method of claim 1, wherein the de-interleaving the reduced symbols is performed by a symbol de-interleaver at the mobile device.

5. The method of claim 4, wherein the data symbols are obtained by de-spreading symbols within a physical channel that is divided into sub-frames, and wherein the symbol buffer comprises a physical channel 'PhCH' buffer at the mobile device that stores a complete sub-frame of the physical channel.

6. The method of claim 5, wherein the symbol de-interleaver performs demapping of the reduced symbols to determine soft decisions for the reduced symbols.

7. The method of claim 1, wherein the symbol buffer is a subframe symbol buffer stored in local memory of the mobile device and wherein the subframe symbol buffer stores de-interleaved reduced symbols from the de-interleaver.

8. The method of claim 1, further comprising:
receiving channel symbols within a plurality of physical channels, the physical channels being divided into a plurality of sub-frames; and
obtaining the data symbols by de-spreading channel symbols within one physical channel,
wherein the storing comprises storing all symbols for a particular physical channel subframe, and
wherein the de-interleaving is performed after storing all symbols for the particular physical channel subframe.

9. The method of claim 1, further comprising, buffering into a QAM amplitude buffer, while storing the reduced symbols in the symbol buffer the QAM amplitudes during the de-interleaving, and
wherein performing the modulation demapping comprises retrieving QAM amplitudes from the QAM amplitude buffer in a temporal order corresponding to the de-interleaving.

10. A mobile device configured to:
de-spread one or more data symbols to produce de-spread data symbols, each data symbol representing respective data encoded as a respective quadrature amplitude modulated 'QAM' symbol;
determine reduced symbols based on the de-spread data symbols, each reduced symbol comprising:
a respective first pulse amplitude modulated 'PAM' symbol representing a respective PAM data symbol for an in-phase component of a respective data symbol, and
a respective second pulse amplitude modulated 'PAM' symbol representing a respective PAM data symbol for a quadrature component of the respective data symbol,
wherein the in-phase component of the respective data symbol and the quadrature component of the respective data symbol indicate independent data;
store, prior to modulation demapping to determine soft decisions from the reduced symbols, the reduced symbols in a symbol buffer;
while the reduced symbols are stored in the symbol buffer and prior to performing the modulation demapping, estimate QAM amplitudes of the de-spread data symbols;
after the reduced symbols have been stored in the symbol buffer, de-interleaving the reduced symbols to produce de-interleaved reduced symbols;
perform, based on the estimation of QAM amplitudes, the modulation demapping on the de-interleaved reduced symbols to produce soft decisions;
perform constellation de-arrangement of the soft decisions; and
based on performing the constellation de-arrangement, perform rate de-matching and HARQ combining of the soft decisions.

11. The mobile device of claim 10, wherein the data symbols are obtained by de-spreading symbols within a physical channel that is divided into sub-frames, and wherein the symbol buffer comprises a physical channel 'PhCH' buffer at the mobile device that stores a complete sub-frame of the physical channel.

12. The mobile device of claim 11, wherein a symbol de-interleaver demaps the reduced symbols.

13. The mobile device of claim 10, wherein the symbol buffer is a subframe symbol buffer stored in local memory of the mobile device and wherein the subframe symbol buffer stores de-interleaved reduced symbols from a de-interleaver.

14. A non-transitory computer-readable memory having computer instructions stored therein, which computer instructions, when executed, cause a computer to:
de-spread one or more data symbols to produce de-spread data symbols, each data symbol representing respective data encoded as a respective quadrature amplitude modulated 'QAM' symbol;
determine reduced symbols based on the de-spread data symbols, each reduced symbol comprising:
a respective first pulse amplitude modulated 'PAM' symbol representing a respective PAM data symbol for an in-phase component of a respective data symbol, and
a respective second pulse amplitude modulated 'PAM' symbol representing a respective PAM data symbol for a quadrature component of the respective data symbol,
wherein the in-phase component of the respective data symbol and the quadrature component of the respective data symbol indicate independent data;
store, prior to modulation demapping to determine soft decisions from the reduced symbols, the reduced symbols in a symbol buffer;
while the reduced symbols are stored in the symbol buffer and prior to performing the modulation demapping, estimate QAM amplitudes of the de-spread data symbols;
after the reduced symbols have been stored in the symbol buffer, de-interleaving the reduced symbols to produce de-interleaved reduced symbols;
perform, based on the estimation of QAM amplitudes, the modulation demapping on the de-interleaved reduced symbols to produce soft decisions;
perform constellation de-arrangement of the soft decisions; and
based on performing the constellation de-arrangement, perform rate de-matching and HARQ combining of the soft decisions.

* * * * *